JOHN R. MOFFITT.
Heel-Stiffeners for Boots and Shoes.
No. 127,090. Patented May 21, 1872.
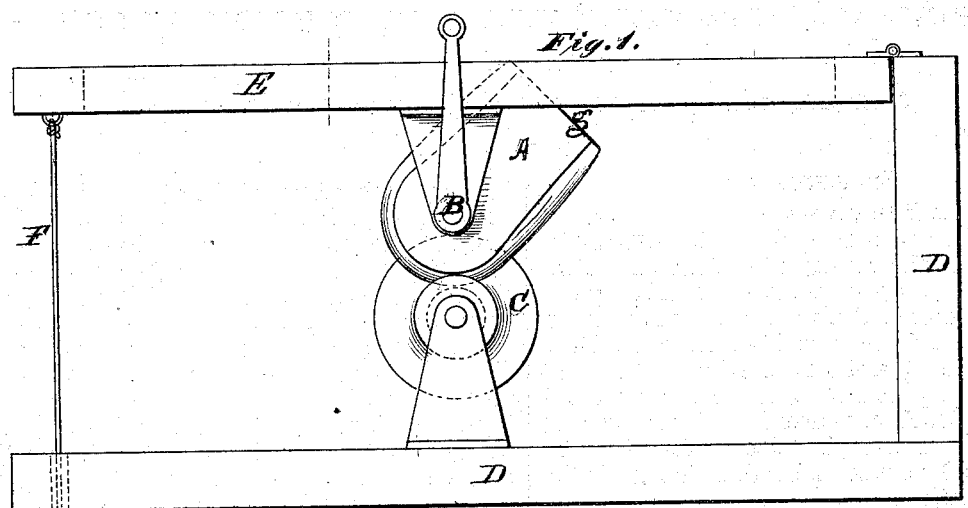
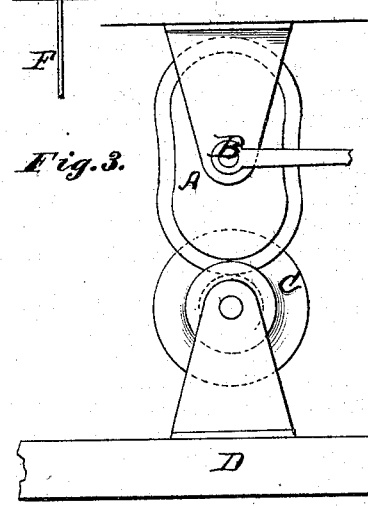 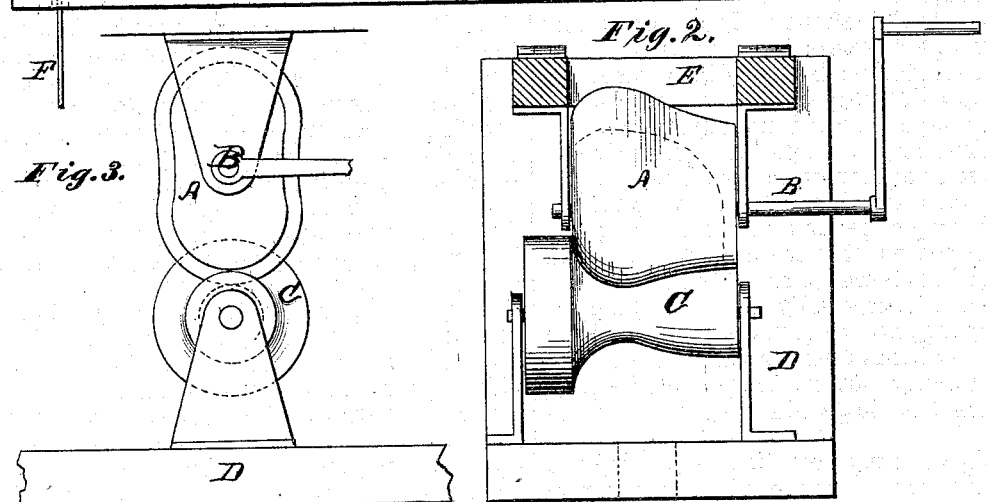
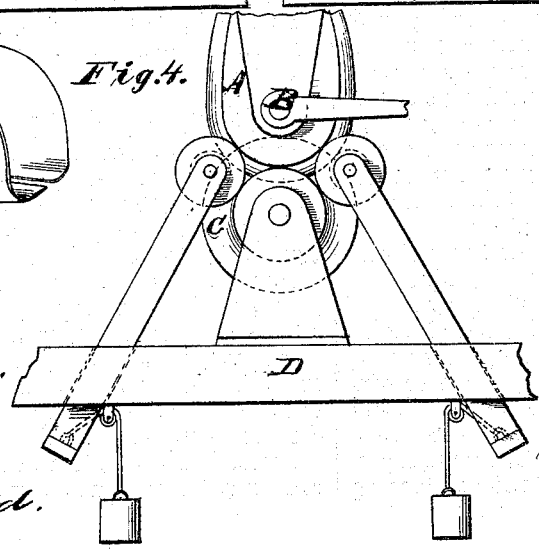
Witnesses.
J. R. Young
N. Bradford.
Inventor:
John R. Moffitt.
by his atty;
John J. Halsted.

UNITED STATES PATENT OFFICE.

JOHN R. MOFFITT, OF CHELSEA, MASSACHUSETTS.

IMPROVEMENT IN THE MANUFACTURE OF HEEL-STIFFENERS FOR BOOTS AND SHOES.

Specification forming part of Letters Patent No. 127,090, dated May 21, 1872.

SPECIFICATION.

*To all whom it may concern:*

Be it known that I, JOHN R. MOFFITT, of Chelsea, in the county of Suffolk and State of Massachusetts, have invented an Improved Heel-Stiffener or Counter for Boots and Shoes, and a new Process and Machinery for Making the same; and I do hereby declare that the following, taken in connection with the drawing which accompanies and forms part of this specification, is a description of my invention sufficient to enable those skilled in the art to practice it.

In "molding" to shape ready-made counters or stiffeners for heels of boots and shoes made of various materials, but usually of waste bits of leather, a difficulty exists, by reason of the peculiar shape required, in getting an equal or sufficient pressure upon all parts of such counter, so as to get uniform hardness throughout; and also a further difficulty, in getting a true and proper permanent form throughout all parts, because the material will differ in character in different parts of the same counter—some of it, especially in leather, being of a more spongy nature than other parts. This difference or lack of homogeneity prevents an uniform solidity and precludes the true preservation of the shape which a mold may impart.

The object of my invention is not only to make more perfect ready-made, shaped counters than can be made by any "molding" process, but also to make a new article of manufacture, viz., a "rolled" counter, prepared, solidified, and uniformly hardened and set to shape by a rolling pressure, such rolling action producing a new as well as better article, and admitting of producing the same from material hitherto found too intractable, such as leather-board, sheet metal, &c.

Instead, therefore, of shaping the stiffener in a mold, I employ no mold of any kind, but use a moving "former," A, devised by me, of a shape adapted to give the desired shape to the counter, and set eccentrically on a shaft, B, the shaft being arranged to have a continuous or a reciprocating rotary movement, either by hand or by power, as desired. Beneath this "former" I place a roller, C, having a profile, as shown, the converse of and conforming to that of the "former," the shaft of the roller having its bearings in the main frame D. The shaft of the "former" has its bearings in a swing-frame, E. F is a treadle-strap whereby the swing-frame may be pulled down to give any required degree of pressure, and which also permits the eccentric former to rise and fall as in its movements it rides and rolls over the surface of the counter, the counter-piece being placed centrally upon the "former," and being rubbed and rolled as well as squeezed between them while being brought to shape.

If leather-board or pulpy material be used the roll and the "former" should be of metal, in order to give the counter the proper firmness throughout its whole body or surface.

If leather or bits of leather pasted or united together (commonly known as "pan-cake") be used, then the roll or "former," or both, should be of rubber or other material capable of yielding to some extent to adapt itself to the different thickness of the leather, but not yielding enough to prevent the proper compression and compacting of the leather.

In operating the apparatus, the piece for the counter, being properly cut or prepared, is placed on the "former," and, by hand or machinery, a reciprocating rotary motion of something less than an entire revolution is given to its shaft, so as to bring the most or all of the operating surface of the former into action. This action is continued as long, and the amount of pressure given should be as great, as the character of the material being operated upon or the exigencies of the case may demand.

The "former," as will be seen, projects further from its axis on one side than on the other, so as to conform nearly to the general form of the curves of the inside of a shaped counter. This gives a rolling action, in addition to the squeezing, over the whole body of the counter.

The end *g* of the "former" need not be a plane, as shown in Fig. 1, but instead may be rounded as at its opposite end, as shown in Fig. 3, so that it may be continuously revolved and in either direction. In such case I prefer to place the shaft through its center or equally distant from both its ends.

Instead of a single roll a pair of auxiliary rolls may be used, as shown in Fig. 4, one on each side of the single one, and each having a yielding support by means of a spring or weight, whereby it may, as the "former" revolves or moves, be forced up against the material being rolled to shape, and serve to hold it close against the "former," the weights or springs allowing such auxiliary rolls to recede as the motion of the "former" may demand.

The roll or rolls may be made up, if desired, of a series of rings, instead of being solid.

Fig. 5 represents a shaped stiffener for a boot or shoe heel.

I claim—

1. The described apparatus for rolling to shape heel-stiffeners or counters.
2. I also claim, as a new article of manufacture, heel-stiffeners or counters shaped and compacted by a rolling action, as described.
3. I also claim the process herein described of shaping and setting to shape heel-stiffeners or counters by rolling, as distinguished from molding.

JOHN R. MOFFITT.

Witnesses:
W. BRADFORD,
WILLIAM FITCH.